(12) United States Patent
Suthar (10) Patent No.: US 9,978,008 B2
(45) Date of Patent: May 22, 2018

(54) TRANSACTION CARD HAVING INTERNAL MAGNETIC STRIPE

(71) Applicant: Capital One Services, LLC, McLean, VA (US)

(72) Inventor: Om J Suthar, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days. days.

(21) Appl. No.: 15/698,419

(22) Filed: Sep. 7, 2017

(65) Prior Publication Data
US 2018/0082164 A1    Mar. 22, 2018

Related U.S. Application Data

(63) Continuation of application No. 15/698,307, filed on Sep. 7, 2017.
(60) Provisional application No. 62/385,220, filed on Sep. 8, 2016.

(51) Int. Cl.
*G06K 19/06* (2006.01)
*B29C 45/14* (2006.01)
*G06K 19/07* (2006.01)

(52) U.S. Cl.
CPC ........ *G06K 19/06196* (2013.01); *B29C 45/14* (2013.01); *G06K 19/07* (2013.01)

(58) Field of Classification Search
None
See application file for complete search history.

(56) References Cited

U.S. PATENT DOCUMENTS

| | | | |
|---|---|---|---|
| 4,141,400 A | 2/1979 | Mangan | |
| 2004/0237360 A1* | 12/2004 | Nelms | A45C 11/182 40/124.04 |
| 2005/0284930 A1 | 12/2005 | Hefner et al. | |
| 2006/0006225 A1 | 1/2006 | Goade et al. | |
| 2007/0241183 A1 | 10/2007 | Brown et al. | |
| 2014/0074696 A1 | 3/2014 | Glaser | |
| 2014/0174645 A1* | 6/2014 | Segura | B32B 37/206 156/247 |
| 2017/0061269 A1* | 3/2017 | Andelin | G06K 19/022 |

OTHER PUBLICATIONS

Partial European Search Report for European Patent Application No. EP 17190246.3 dated Jan. 18, 2018, pp. 1-10.

* cited by examiner

*Primary Examiner* — Kristy A Haupt
(74) *Attorney, Agent, or Firm* — Finnegan, Henderson, Farabow, Garrett & Dunner LLP (57) ABSTRACT

A transaction card is provided. The transaction card includes a card frame having a card inlay and a card housing. The transaction card also includes a magnetic stripe disposed inside the card frame between the card inlay and the card housing.

20 Claims, 9 Drawing Sheets

TRANSACTION CARD HAVING INTERNAL MAGNETIC STRIPE

CROSS-REFERENCE TO RELATED APPLICATIONS

This application is a continuation of a U.S. Non-Provisional patent application Ser. No. 15/698,307 filed Sep. 7, 2017, which claims priority to U.S. Provisional Patent Application Ser. No. 62/385,220 filed Sep. 8, 2016. The contents of both applications are hereby incorporated in their entireties.

TECHNICAL FIELD

The disclosed embodiments generally relate to transaction cards, and particularly, to transaction cards having an internal magnetic stripe.

BACKGROUND

Transaction cards, such as credit and debit cards, have increasingly become a primary means for customers to complete financial transactions. Typically, transaction cards are cut from laminated sheets of polyvinyl chloride (PVC) or polycarbonate (PC), or other similar materials. After the overall shape of the card is formed, the card may be modified to add functional and/or visual features. For example, a magnetic stripe and/or microchip may be affixed to one side, the card may be stamped with the card number and customer name, and color or a design may be added for appearance. The magnetic stripe is typically affixed to an exterior surface of the card.

As transaction cards increase in prevalence, expectations for transaction card quality have increased. Transaction cards have increasingly been made to meet higher standards regarding materials, durability, and especially security. For example, in traditional cards, the magnetic stripes are exposed on the exterior of the cards, and are easy to tamper with. The magnetic stripes can be removed relatively easily, and the code information relating to an account recorded on the magnetic stripe can be quickly stolen with a low-cost reading device.

The present disclosure is directed to overcoming one or more of the problems set forth above and/or other problems associated with conventional/traditional transaction cards.

SUMMARY

The disclosed embodiments include a transaction card. The transaction card can include a card frame having a card inlay and a card housing. The transaction card can, also, include a magnetic stripe disposed inside the card frame between the card inlay and the card housing.

The transaction card can further include, in some aspects, a pocket containing the magnetic stripe. The pocket can be defined by the card inlay or the card housing. In some aspects, the pocket can be defined by the inner surface of the card inlay or the inner surface of the card housing. In some aspects, a first portion of the pocket can be defined by an inner surface of the card inlay, and a second portion of the pocket can be defined by an inner surface of the card housing.

The transaction card can further include, in some aspects, a card frame that has a first curved shape and a magnetic stripe that has a second curved shape. In some aspects, the magnetic stripe can be located at a distance of 100-190 microns to an exterior surface of the card inlay or the card housing. In some aspects, the magnetic stripe can be a high output magnetic stripe.

The transaction card can further include, in some aspects, a stripe indicator located on an exterior surface of the card frame. In some aspects, the stripe indicator can be located at the same location with respect to edges of the card frame as the magnetic stripe.

Consistent with another disclosed embodiment, a method of manufacturing a transaction card is provided. The method can include forming a card inlay, forming a card housing, forming a pocket in at least one of the card inlay and the card housing, positioning a magnetic stripe on at least one of an inner surface of the card inlay and an inner surface of the card housing at a location corresponding to the pocket, and attaching the card inlay to the card housing to form a card frame. In some aspects, the magnetic stripe can be disposed inside the card frame between the card inlay and the card housing and within the pocket.

The method can further include, in some aspects, forming a stripe indicator on an exterior surface of the card inlay or the card housing to indicate a location of the magnetic stripe inside the card frame. The method can further include, in some aspects, forming the stripe indicator at the same location with respect to edges of the card frame as the magnetic stripe.

The method can further include, in some aspects, forming the card inlay and the card housing by an injection molding process. In some aspects, the method can further include forming the pocket by an injection molding process. In another aspect, the method can further include forming the pocket by a Computer Numerical Control (CNC) process after the injection molding process The method can further include, in some aspects, forming the pocket in the inner surface of the card housing or forming the pocket in the inner surface of the card inlay. The method can further include, in some aspects, forming a first portion of the pocket in an inner surface of the card inlay and forming a second portion of the pocket in an inner surface of the card housing.

The method can further include, in some aspects, positioning the magnetic stripe at a distance of 100-190 microns to an exterior surface of the card inlay or the card housing.

Consistent with another disclosed embodiment, a transaction card is provided. The transaction card can include a curved card frame having a card inlay and a card housing. The transaction card can further include a first recessed portion in the card inlay and a second recessed portion in the card housing that corresponds to the first recessed portion. In some aspects, the first recessed portion and the second recessed portion can together form a pocket. The transaction card can further include a curved magnetic stripe that can be disposed within the pocket. The transaction card can further include a stripe indicator disposed on an exterior surface of the card frame.

The transaction card can further include, in some aspects, a magnetic stripe that occupies an entire space of the pocket such that the magnetic stripe is constrained in at least a thickness direction. In some aspects, the transaction card can further include an adhesive layer inside the pocket. The magnetic stripe can be affixed to the first recessed portion or the second recessed portion by the adhesive layer. The magnetic stripe can be located at a distance of 100-190 microns to an exterior surface of the card inlay or the card housing.

In some aspects, the card frame of the transaction card can have a curvature that is the same as the curvature of the magnetic stripe. In other aspects, the curvature of the card frame and the curvature of the magnetic stripe can be different.

The transaction card can further include a stripe indicator that has a color that is different from a color of the exterior surface of the card frame. In other aspects, the stripe indicator can have a printed pattern that is not present in the exterior surface of the card frame. In some aspects, the stripe indicator can have a texture that is different from the texture of the exterior surface of the card frame. The stripe indicator can also include icons or texts. The icons or texts can indicate a location of the magnetic stripe.

Consistent with another disclosed embodiment, a method of manufacturing a transaction card is provided. The method can include forming a curved card frame. The card frame can include a card inlay and a card housing. The method can further include forming a first recessed portion in the card inlay, forming a second recessed portion that corresponds to the first recessed portion in the card housing, attaching the card inlay to the card housing to form a pocket defined by the first recessed portion to the second recessed portion, positioning a curved magnetic stripe within the pocket, and disposing a stripe indicator on an exterior surface of the card frame.

The method can further include, in some aspects, providing a magnetic stripe that occupies an entire space of the pocket such that the magnetic stripe is constrained in at least a thickness direction. The method can further include, in some aspects, disposing an adhesive layer inside the pocket and fixing the magnetic stripe to the first recessed portion or the second recessed portion by the adhesive layer. The magnetic stripe can be located at a distance of 100-190 microns to an exterior surface of the card inlay or the card housing. In some aspects, the magnetic stripe can have a curvature that is the same as the curvature of the card frame. In other aspects, the magnetic stripe can have a curvature that is different from the curvature of the card frame.

The method can further include, in some aspects, disposing a stripe indicator that has a color that is different from a color of the exterior surface of the card frame. In some aspects, the stripe indicator can have a printed pattern that is not present in the exterior surface of the card frame. In other aspects, the stripe indicator can have a texture that is different from a texture of the exterior surface of the card frame. In some aspects, the stripe indicator can have icons or texts. The icons or texts can indicate a location of the magnetic stripe.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Disclosed embodiments include cards and methods for manufacturing cards, such as transaction cards. The term "transaction card," as used herein, refers to any physical card product that is configured to provide information, such as financial information (e.g., card numbers, account numbers, account balance, etc.), quasi-financial information (e.g., rewards balance, discount information, etc.), and/or individual-identifying information (e.g., name, address, etc.), when the card is read by a card reader. Examples of transaction cards include credit cards, debit cards, gift cards, rewards cards, frequent flyer cards, merchant-specific cards, discount cards, etc., but are not limited thereto. The term "transaction card" may include an identification card such as a passport card, a driver's license, an entry point access card, or the like. The physical properties of the transaction card (e.g., size, flexibility, location of various components included in the card) may meet the various international standards, including, e.g., ISO/IEC 7810, ISO/IEC 7811, ISO/IEC 7812, ISO/IEC 7813, ISO/IEC 7816, ISO 8583, ISO/IEC 4909, and ISO/IEC 14443. For example, a transaction card may have a dimension of 85.60 mm (width) by 53.98 mm (height) by 0.76 mm (thickness), as specified in ISO/IEC 7810.

Disclosed embodiments may improve transaction card security by embedding the magnetic stripe inside the card, e.g., between two pieces (card housing and card inlay) of the card in a two-piece card construction. By disposing the magnetic stripe inside the card, it is more difficult to steal information stored in the stripe. Any attempt to remove the stripe from the card may destroy the stripe or damage other parts of the card. In addition, disposing the magnetic stripe inside the card protects the magnetic stripe from other outside objects, thereby reducing wear and tear. Moreover, by disposing the magnetic stripe inside the card, the magnetic stripe can be affixed to the card more securely. Disposing the magnetic stripe inside the card also eliminates the potential problem of delamination in existing card designs that may be caused by flexure (e.g., bending) of the cards or by wear and tear. Finally, by disposing the magnetic stripe inside the card, more space is available on the surface of the card for ornamental design to provide better aesthetics.

Figure 1:
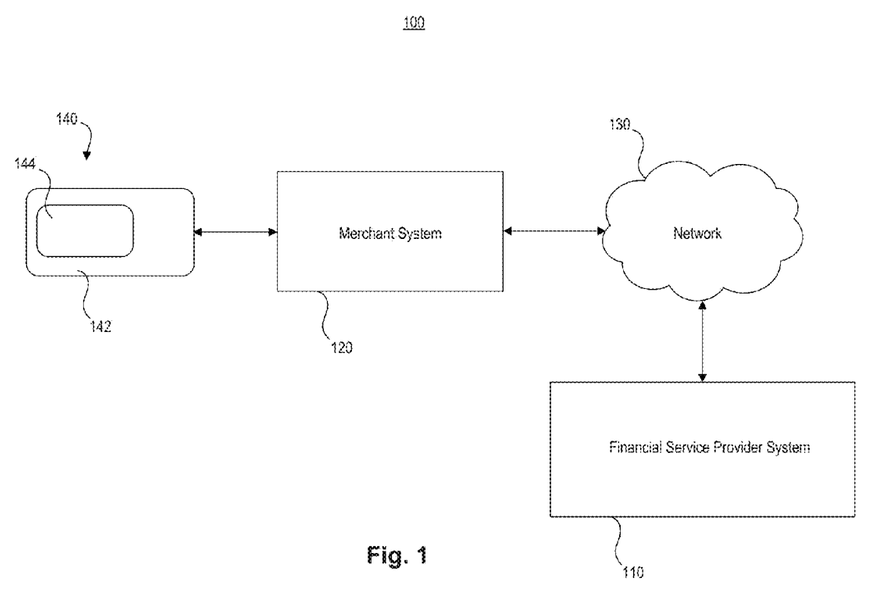
FIG. 1 is a block diagram of an exemplary transaction system, consistent with disclosed embodiments.

FIG. 1 illustrates an exemplary transaction system 100. Transaction system 100 may include a computing system configured to receive and send information between the components of transaction system 100 and components outside of transaction system 100. Transaction system 100 may include a financial service provider system 110 and a merchant system 120 communicating with each other through a network 130. Transaction system 100 may include additional and/or alternative components.

Financial service provider system 110 may include one or more computer systems associated with an entity that provides financial services. For example, the entity may be a bank, credit union, credit card issuer, or other type of financial service entity that generates, provides, manages, and/or maintains financial service accounts for one or more customers. Financial service accounts may include, for example, credit card accounts, checking accounts, savings accounts, loan accounts, reward accounts, and any other types of financial service accounts. Financial service accounts may be associated with physical financial service transaction cards, such as credit or debit cards that customers use to perform financial service transactions, such as purchasing goods and/or services online or at a point of sale (POS) terminal. Financial service accounts may also be associated with electronic financial products and services, such as a digital wallet or similar account that may be used to perform electronic transactions, such as purchasing goods and/or services online.

Merchant system 120 may include one or more computer systems associated with a merchant. For example, merchant system 120 may be associated with an entity that provides goods and/or services (e.g., a retail store). The merchant may include brick-and-mortar location(s) that a customer may physically visit and where the customer may purchase goods and services using the transaction cards. Such physical locations may include computing devices (e.g., merchant system 120) that perform financial service transactions with customers (e.g., POS terminal(s), kiosks, etc.). Additionally or alternatively, merchant system 120 may be associated with a merchant who provides an electronic shopping environment, such as a website or other online platform that consumers may access using a computer through a browser, a mobile application, or similar software. Merchant system 120 may include a client device, such as a laptop computer, desktop computer, smart phone, or tablet, which a customer may operate to access the electronic shopping mechanism.

Network 130 may include any type of network configured to facilitate communications and data exchange between components of transaction system 100, such as, for example, financial service provider system 110 and merchant system 120. Network 130 may include a Local Area Network (LAN) or a Wide Area Network (WAN), such as the Internet. Network 130 may be a single network or a combination of networks. Network 130 is not limited to the above examples and transaction system 100 may employ any type of network that allows entities (shown and not shown) of transaction system 100 to exchange data and information.

Transaction system 100 may be configured to conduct a transaction using a transaction card 140. In some embodiments, financial service provider system 110 may provide transaction card 140 to a customer for use in conducting transactions associated with a financial service account held by the customer. For example, the customer may use transaction card 140 at a merchant location to make a purchase. During the course of the purchase, information may be transferred from transaction card 140 to merchant system 120 (e.g., a point of sale device). Merchant system 120 may communicate with financial service provider system 110 via network 130 to verify the information and to complete or deny the transaction. For example, merchant system 120 may receive account information from transaction card 140. Merchant system 120 may transmit the account information and a purchase amount, among other transaction information, to financial service provider system 110. Financial service provider system 110 may settle the transaction by transferring funds from the customer's financial service account to a financial service account associated with the merchant.

While transaction system 100 and transaction card 140 are depicted and described in relation to transactions that involve customers, merchants, and financial service providers, it should be understood that these entities are used only as an example to illustrate one environment in which transaction card 140 may be used. Moreover, it should be understood that transaction card 140 is not limited to financial products and may be any physical card product that is configured to provide information to another device. For example, transaction card 140 may be an identification card configured to provide information to a device in order to identify the holder of the card (e.g., driver's license) or provide information about the holder of the card (e.g., insurance card).

In some embodiments, transaction card 140 may further include a transaction component 144 disposed on or in a transaction card frame ("card frame") 142. As used herein, a "transaction component" may be one or more devices and/or elements configured to receive, store, process, provide, transfer, send, delete, and/or generate information. For example, transaction component 144 may be a microchip (e.g., an Europay, MasterCard, and Visa (EMV) chip), a communication device (e.g., Near Field Communication (NFC) antenna, Bluetooth® device, WiFi device), a magnetic stripe, a barcode, Quick Response (QR) code, or a combination thereof. Transaction component 144 may be secured (or affixed, attached) to card frame 142 in such a way that allows card frame 142 to carry transaction component 144 while maintaining a utility of transaction component 144 (i.e., allowing transaction component 144 to interact with merchant system 120).

Figure 2:
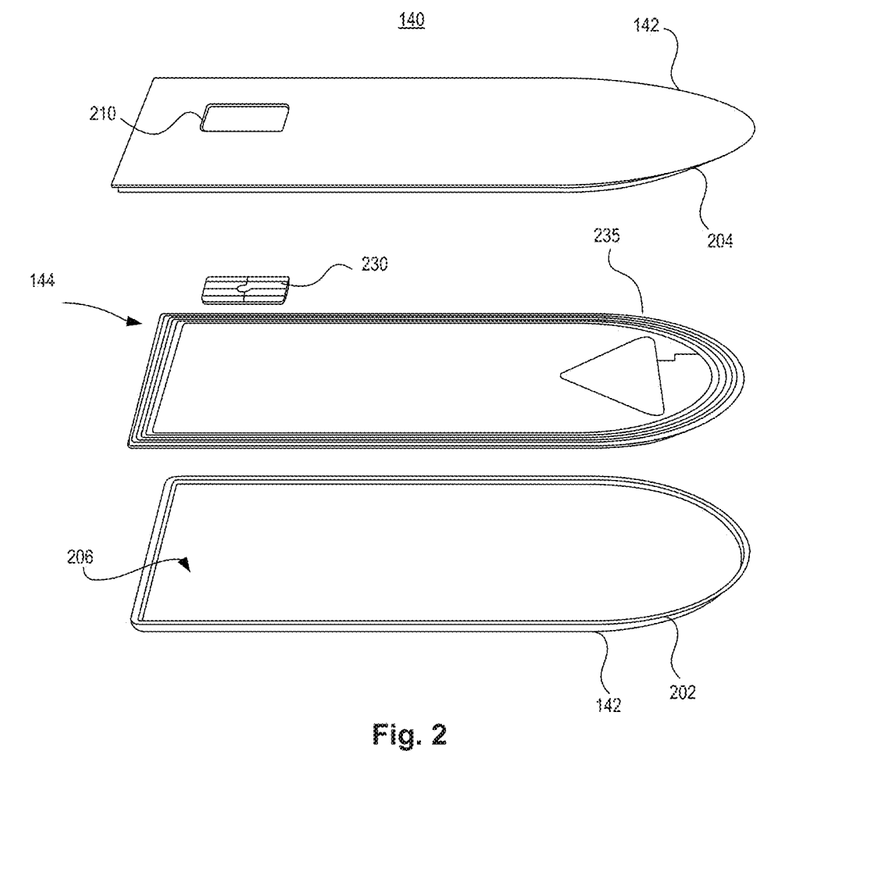
FIG. 2 illustrates an exemplary transaction card, consistent with the disclosed embodiments.

FIG. 2 illustrates an exemplary transaction card 140, consistent with the disclosed embodiments. In the embodiment of FIG. 2, transaction card 140 includes a two-piece construction. For example, card frame 142 may include two separate, independently removable card components: a lower card component 202 and an upper card component 204. Lower and upper card components 202, 204 may be referred to as first and second card components, or vice versa. Although lower and upper card components 202 and 204 are shown as having a planar (e.g., flat) shape, it is understood that one or both of them may have a curved shape (e.g., having a curved surface).

In one embodiment, card frame 142 may include a construction in which lower card component 202 forms a cavity or space 206 (hence lower card component 202 may be referred to as a "card housing") and upper card component 204 forms an inlay component (hence upper card component 204 may also be referred to as a "card inlay") configured to be seated within space 206. It should be understood, however, that other configurations are possible. For example, transaction card 140 may include a "bucket-and-lid" construction in which lower card component 202 forms a container and upper card component 204 forms a lid that is configured to close the container and that rests on a rim of lower card component 202. Lower card component 202 and upper card component 204 may be securable to each other to at least partially define space 206 to accommodate transaction component 144.

Lower card component 202 and upper card component 204 may be permanently or temporarily secured to each other to form a complete card frame 142. For example, lower card component 202 may be secured to upper card component 204 using an adhesive, or by over-molding, pressure fit, interference fit, clasp, tongue-in-groove, post-and-hole, etc. If lower card component 202 and upper card component 204 are temporarily secured to each other, an attachment feature (e.g., for hinged attachment, sliding attachment, etc.) may be included to allow card frame 142 to be disassembled. Other techniques for securing lower card component 202 to upper card component 204 may be apparent to those of skill in the art.

In some embodiments, as shown in FIG. 2, transaction component 144 may include a first transaction component 230 and a second transaction component 235 that are positioned within enclosed space 206. First transaction component 230 may be a microchip and second transaction component 235 may be a Near Field Communication (NFC) antenna. It should be understood that first transaction component 230 and second transaction component 235 are examples, and that other configurations are possible (e.g., transaction card 140 may include additional and/or alternative transaction components, or may include only one of first and second transaction components 230 and 235).

Figure 3:
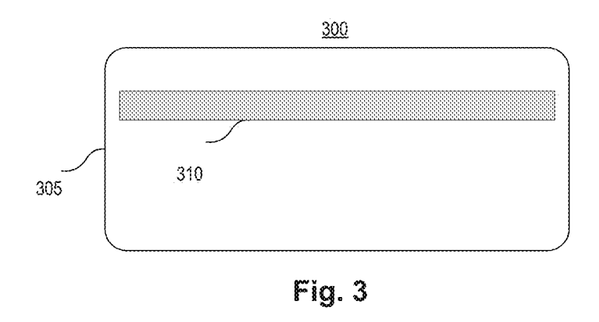
FIG. 3 is a top view of a traditional transaction card.

FIG. 3 is a top view of a traditional transaction card 300. The top view may be a front review or a back view of traditional transaction card 300. As shown in FIG. 3, traditional transaction card 300 includes a card frame 305 and a magnetic stripe 310 provided on an exterior surface of card frame 305. The magnetic stripe may be provided on a front side or a back side of card frame 305. In either configuration, in a traditional transaction card, the magnetic stripe is affixed to and exposed on an exterior of the card frame, as shown in FIG. 3.

For traditional transaction cards, current industry practice may apply an over-lamination over the card surfaces (including the magnetic stripe) with an adhesive. The current over-lamination used in the industry is sufficiently thin to allow the magnetic stripe to be read by a card reader. The over-lamination also serves as additional securing mechanism for holding the magnetic stripe to the card. However, the over-lamination is typically applied during the card printing process (e.g., printed by a card printer), after the card frame with the magnetic stripe has been made. The extra process of applying the over-lamination increases the cost of card production.

In traditional card manufacturing processes, injection molding is typically not used. Thus, while the industry practice may use thick laminations to improve protection and fixation of the magnetic stripe, the card manufacturing industry has not yet considered technologies for disposing the magnetic stripe inside the card during a card manufacturing process.

Figure 4:
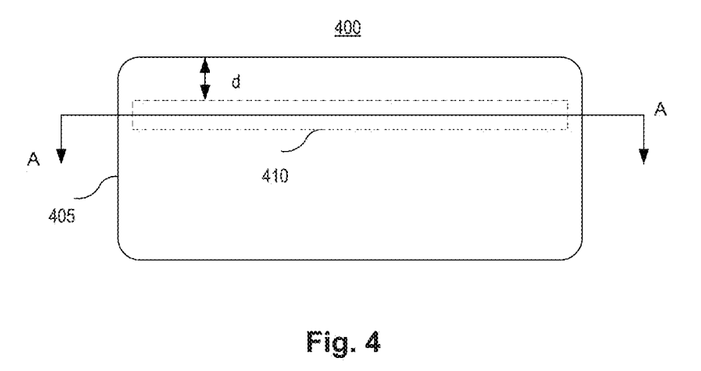
FIG. 4 is a top view of an exemplary transaction card, consistent with the disclosed embodiments.

FIG. 4 is a top view of an exemplary transaction card 400 consistent with the disclosed embodiments. As shown in FIG. 4, transaction card 400 includes a card frame 405 and a magnetic stripe 410 disposed inside the card frame (the dashed line indicates that magnetic stripe 410 is disposed inside the card frame). Magnetic stripe 410 may be disposed at a location corresponding to a location where a traditional magnetic stripe would appear on a card. For example, magnetic stripe 410 may be disposed 1-3 mm inward from an outer edge of transaction card 400 (e.g., distance d from the top edge shown in FIG. 4 may be 1-3 mm). The shape of transaction card 400 may be any suitable shape, such as rectangular, triangular, circular, or a combination of any shapes. The dimension of magnetic stripe 410 may be any suitable dimension. For example, the dimension of magnetic stripe 410 may follow the Visa® standards or ISO standards.

Figure 5A:
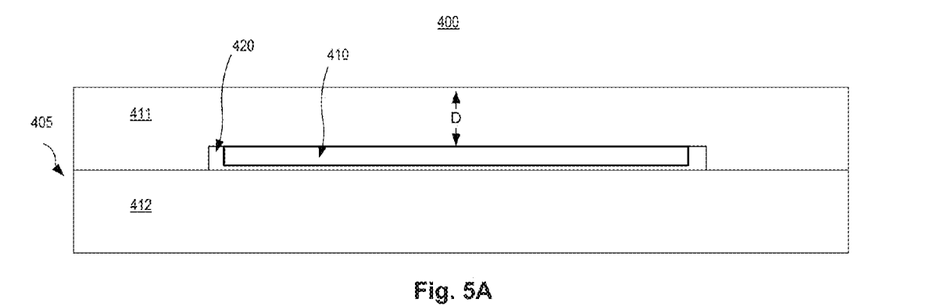
FIGS. 5A and 5B show cross-sectional views of the exemplary transaction card shown in FIG. 4 taken along line A-A of FIG. 4, consistent with different disclosed embodiments.
Figure 5B:
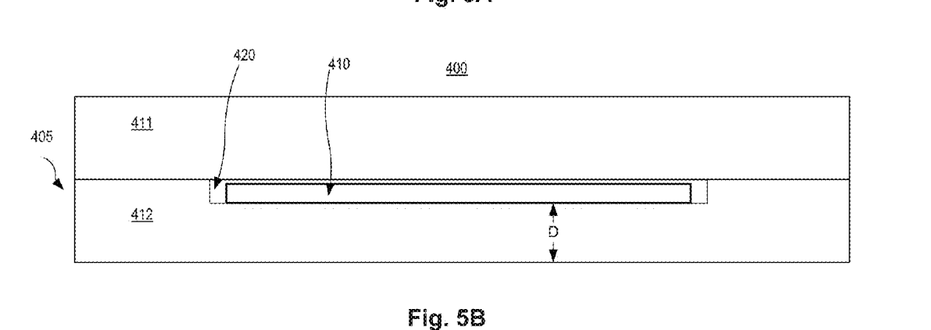

FIGS. 5A and 5B show cross-sectional views of the exemplary transaction card 400 shown in FIG. 4 taken along line A-A of FIG. 4, consistent with different disclosed embodiments. FIGS. 5A and 5B show that magnetic stripe 410 is disposed inside card frame 405. In a two-piece construction, card frame 405 may include a first card component 411 (also referred to as "card inlay 411") and a second card component 412 (also referred to as "card housing 412"). Card frame 405 may be similar to card frame 142 shown in FIG. 2.

Referring now to FIG. 5A, to accommodate magnetic stripe 410 disposed inside card frame 405, a pocket or cavity (e.g., pocket 420) may be formed in at least one of card inlay 411 or card housing 412. FIG. 5A shows the configuration in which pocket 420 is formed in card inlay 411. FIG. 5B shows the configuration in which pocket 420 is formed in card housing 412. As shown in FIGS. 5A and 5B, magnetic stripe 410 is disposed within pocket 420, and affixed to an inner surface of card inlay 411 (shown in FIG. 5A) or card housing 412 (shown in FIG. 5B). Although magnetic stripe 410 is shown to occupy a space less than the entire space of pocket 420, it is understood that magnetic stripe 410 may occupy the entire space of pocket 420.

Pocket 420 may be formed in an inner surface of at least one of card inlay 411 or card housing 412. The inner surfaces of card inlay 411 and card housing 412 are the respective surfaces that face each other when they are attached to each other to form card frame 405. Pocket 420 may be formed during a molding process (e.g., an injection molding process) when card frame 405 (e.g., card inlay 411 and card housing 412) is made. For example, pocket 420 may be formed in a same injection molding process as card inlay 411 and/or card housing 412. Alternatively or additionally, pocket 420 may be formed subsequent to the formation of card frame 405 (e.g., card housing 412 and/or card inlay 411), such as by a computer numerical control (CNC) machining process. After card frame 405 (e.g., card inlay 411 and/or card housing 412) is formed, pocket 420 may be formed in card inlay 411 and/or card housing 412 by a separate CNC machining process. The CNC machining process may include milling, laser cutting, grinding, lathing, etc. For example, a portion of material may be removed from an inner surface of card inlay 411 and/or an inner surface of card housing 412 to form pocket 420.

In one embodiment, as shown in FIG. 5B, pocket 420 is formed in the inner surface of card housing 412, either by the injection molding process or by the machining process. Magnetic stripe 410 may be disposed within pocket 420. For example, after pocket 420 is formed in card housing 412, an adhesive layer (not shown) may be placed in pocket 420. Magnetic stripe 410 may be placed onto the adhesive layer and secured to an inner surface of card housing 412 by the adhesive layer. Card inlay 411 and card housing 412 may then be assembled (e.g., attached) together to form card frame 405, with magnetic stripe 410 being positioned within pocket 420. FIG. 5B schematically shows that magnetic stripe 410 is positioned in pocket 420 provided in an inner surface of card housing 412 when card frame 405 is formed. In some embodiments, an adhesive layer may not be used. Magnetic stripe 410 may be placed within pocket 420 and be securely held by card inlay 411 and card housing 412 when they are attached to each other to form card frame 405. It is understood that when an adhesive layer is not used, magnetic stripe 410 may occupy the entire space of pocket 420, at least in the thickness direction of card frame 405, such that magnetic stripe 410 is constrained in at least the thickness direction.

Magnetic stripes are classified into low output magnetic stripes and high output magnetic stripes based on their output signal amplitudes. "High output" means the signal amplitude output from the magnetic stripe, when read by a card reader, is higher than a predetermined threshold (e.g., greater than 100% ISO output specification, such as 130%, 150%, 160%, 180%, etc.). Low output means the signal amplitude output from the magnetic stripe, when read by the card reader, is lower than or equal to a predetermined threshold (e.g., lower than or equal to 100% ISO output specification). In the disclosed embodiments, because the magnetic stripe is disposed inside the card frame, high output magnetic stripes may be used. High output magnetic stripes are currently used in metal cards to overcome the interference created by the metal material, which may cause card reading failure.

As shown in FIGS. 5A-5B, magnetic stripe 410 may be disposed inside card frame 405 at a distance D from a surface of card frame 405. The surface may be an exterior surface of card inlay 411 (shown in FIG. 5A) or card housing 412 (shown in FIG. 5B). The distance D represents a thickness of the material between magnetic stripe 410 and a card reader (e.g., a thickness through which material magnetic stripe 410 has to "work" in order to output a signal). The distance D may be a function of material properties and manufacturing process constraints. In some embodiments, the distance D may be within a range of 100-190 microns. Within this range, a high output magnetic stripe can output a signal that is sufficient for a card reader to capture information coded on the magnetic stripe. It is understood that in some embodiments, the distance D may be less than 100 microns or greater than 190 microns. It is understood from FIGS. 5A and 5B that the distance D also represents the distance from pocket 420 to an exterior surface of card inlay 411 or card housing 412.

Figure 6A:
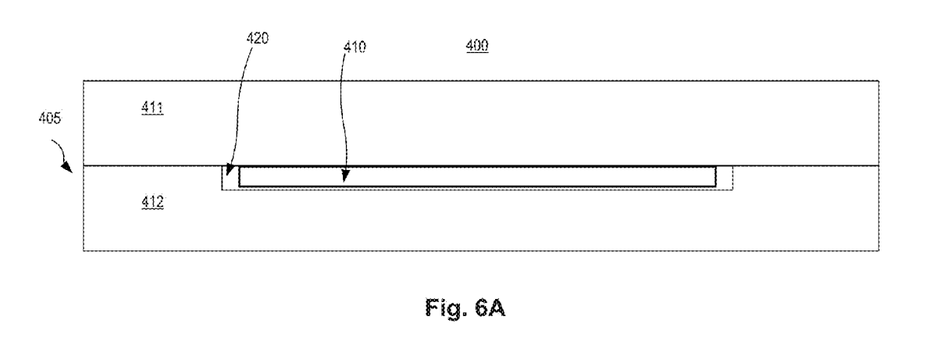
FIG. 6A schematically shows an exemplary magnetic stripe adhered to an inner surface of a card inlay, consistent with the disclosed embodiments.

Referring now to FIG. 6A, when pocket 420 is formed in the inner surface of card housing 412, magnetic stripe 410 may be disposed within pocket 420 through another process. For example, magnetic stripe 410 may be affixed to the inner surface of card inlay 411 (which does not have a pocket) though an adhesive layer (not shown) before card inlay 411 and card housing 412 are assembled together to form card frame 405. Magnetic stripe 410 may be adhered to the inner surface of card inlay 411 at a location that corresponds to the location of pocket 420 in the inner surface of card housing 412, such that magnetic stripe 410 is aligned with pocket 420 when card inlay 411 and card housing 412 are attached to each other.

FIG. 6A schematically shows that magnetic stripe 410 is affixed to an inner surface of card inlay 411, and when card inlay 411 is assembled with card housing 412, magnetic stripe 410 is disposed within pocket 420. Although magnetic stripe 410 is shown to occupy less than the entire space of pocket 420, it is understood that magnetic stripe 410 may occupy the entire space of pocket 420. In some embodiments, an adhesive layer may not be used. Magnetic stripe 410 may be placed within pocket 420 and be securely held by card inlay 411 and card housing 412 when they are attached to each other to form card frame 405. It is understood that when an adhesive layer is not used, magnetic stripe 410 may occupy the entire space of pocket 420, at least in the thickness direction of card frame 405, such that magnetic stripe 410 is constrained in at least the thickness direction.

Figure 6B:
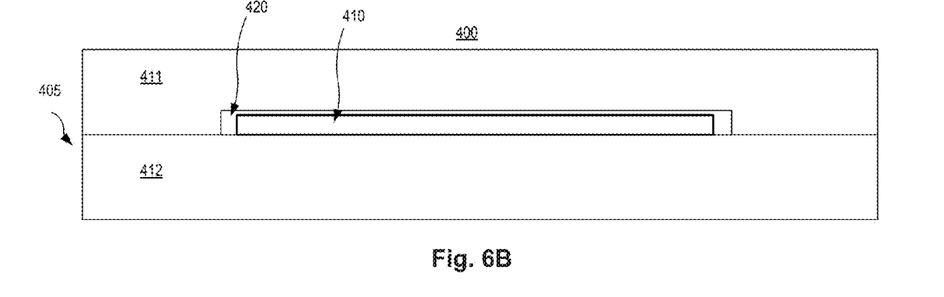
FIG. 6B schematically shows an exemplary magnetic stripe 410 adhered to an inner surface of a card housing, consistent with the disclosed embodiments.

Likewise, when pocket 420 is formed in the inner surface of card inlay 411, as shown in FIGS. 5A and 6B, either by the injection molding process or by the machining process, magnetic stripe 410 may be disposed within pocket 420 via suitable processes similar to those discussed above. For example, in one process, after pocket 420 is formed in card inlay 411, an adhesive layer (not shown) may be placed in pocket 420. Magnetic stripe 410 may be placed onto the adhesive layer and secured to an inner surface of card inlay 411 by the adhesive layer, as shown in FIG. 5A. Card inlay 411 and card housing 412 may then be assembled together to form card frame 405. FIG. 5A schematically shows that magnetic stripe 410 is positioned in pocket 420 provided in an inner surface of card inlay 411 when card frame 405 is formed. In some embodiments, an adhesive layer may not be used. Magnetic stripe 410 may be placed within pocket 420 and be securely held by card inlay 411 and card housing 412 when they are attached to each other to form card frame 405. It is understood that when an adhesive layer is not used, magnetic stripe 410 may occupy the entire space of pocket 420, at least in the thickness direction of card frame 405, such that magnetic stripe 410 is constrained in at least the thickness direction.

In another embodiment, as shown in FIG. 6B, magnetic stripe 410 may be adhered to the inner surface of card housing 412 (which does not have a pocket) through an adhesive layer (not shown) before card inlay 411 and card housing 412 are assembled together. Magnetic stripe 410 may be adhered to the inner surface of card housing 412 at a location that corresponds to the location of pocket 420 on the inner surface of card inlay 411, such that magnetic stripe 410 is aligned with pocket 420 when card inlay 411 and card housing 412 are assembled. FIG. 6B schematically shows that magnetic stripe 410 is adhered to an inner surface of card housing 412, and when card inlay 411 is assembled with card housing 412, magnetic stripe 410 is disposed within pocket 420. Although magnetic stripe 410 is shown to occupy less than the entire space of pocket 420, it is understood that magnetic stripe 410 may occupy the entire space of pocket 420. In some embodiments, an adhesive layer may not be used. Magnetic stripe 410 may be placed within pocket 420 and be securely held by card inlay 411 and card housing 412 when they are attached to each other to form card frame 405. It is understood that when an adhesive layer is not used, magnetic stripe 410 may occupy the entire space of pocket 420, at least in the thickness direction of card frame 405, such that magnetic stripe 410 is constrained in at least the thickness direction.

Figure 7:
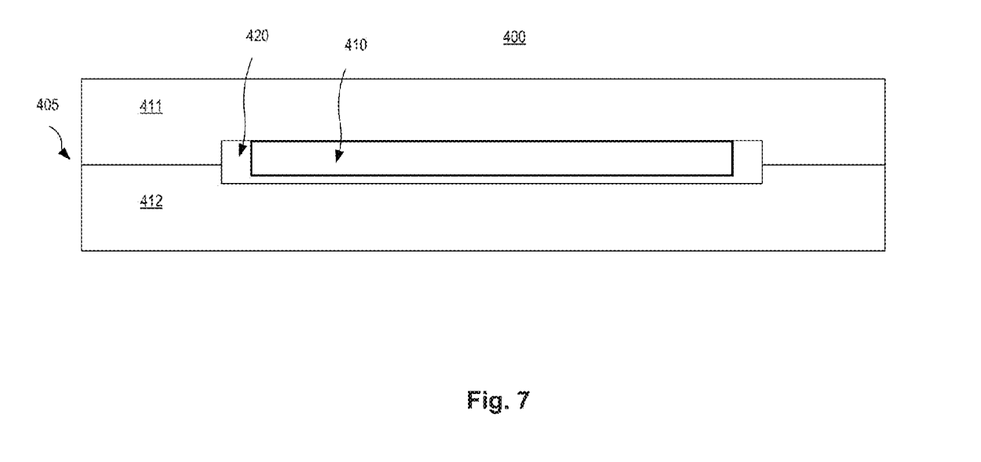
FIG. 7 illustrates a cross-sectional view of the exemplary transaction card shown in FIG. 4 taken along line A-A of FIG. 4, consistent with different disclosed embodiments.

FIG. 7 illustrates a cross-sectional view of the exemplary transaction card 400 shown in FIG. 4 taken along line A-A of FIG. 4, consistent with different disclosed embodiments. As shown in FIG. 7, pocket 420 may include two portions, a first portion formed in the inner surface of card inlay 411 and a second portion formed in the inner surface of card housing 412. For example, the inner surface of card inlay 411 may have a recessed portion defining the first portion of pocket 420, and the inner surface of card housing 412 may have a corresponding recessed portion defining the second portion of pocket 420. Magnetic stripe 410 may be disposed within pocket 420 formed in both card inlay 411 and card housing 412. Although FIG. 7 shows that magnetic stripe 410 occupies less than the entire space of pocket 420, it is understood that in other embodiments, magnetic stripe 410 may occupy the entire space of pocket 420. As shown in FIG. 7, magnetic stripe 410 may be affixed to the inner surface of card inlay 411 through an adhesive layer (not shown), and when card inlay 411 and card housing 412 are assembled together, magnetic stripe 410 is disposed within both the first and second portions of pocket 420. It is understood that in other embodiments, magnetic stripe 410 may be affixed to the inner surface of card housing 412, and when card inlay 411 and card housing 412 are assembled together, magnetic stripe 410 is positioned within both the first and second portions of pocket 420. In some embodiments, an adhesive layer may not be used. Magnetic stripe 410 may be placed within the first or the second portion of pocket 420 before card inlay 411 and card housing 412 are assembled to form card frame 405. When card frame 405 is formed, magnetic stripe 410 may be securely held by card inlay 411 and card housing 412. It is understood that when an adhesive layer is not used, magnetic stripe 410 may occupy the entire space of pocket 420, at least in the thickness direction of card frame 405, such that magnetic stripe 410 is constrained in at least the thickness direction.

Figure 8A:
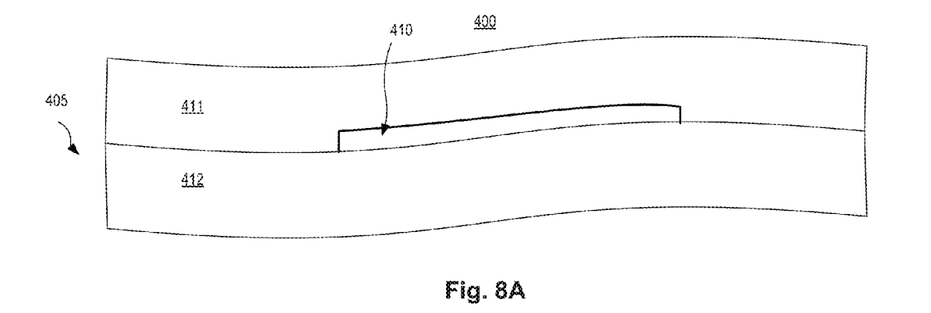
FIGS. 8A and 8B show cross-sectional views of the exemplary transaction card shown in FIG. 4 taken along line A-A of FIG. 4, consistent with different disclosed embodiments.
Figure 8B:
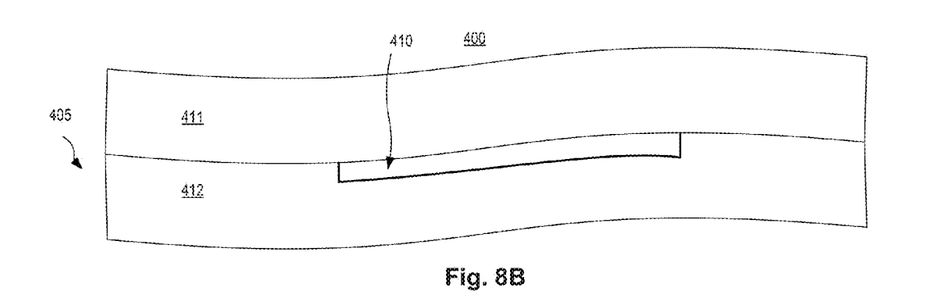

FIGS. 8A and 8B show cross-sectional views of exemplary transaction card 400 shown in FIG. 4 taken along line A-A of FIG. 4, consistent with different disclosed embodiments. As shown in FIGS. 8A and 8B, transaction card 400 may have a curved card frame. That is, surfaces of card frame 405 may be curved instead of being flat. As shown in FIGS. 8A and 8B, magnetic stripe 410 may also have a curved shape. For simplicity, FIGS. 8A and 8B do not show pocket 420 separately. It is understood that magnetic stripe 410 may be disposed within pocket 420, as shown in other embodiments disclosed herein. Magnetic stripe 410 may occupy a portion of pocket 420, or the entire space of pocket 420. Curved magnetic stripe 410 may follow the same curvature as the curved surfaces (or one of the curved surfaces) of card frame 405. In some embodiments, curved magnetic stripe 410 may have a curve that is different from the curve of card frame 405. As shown in FIGS. 8A and 8B, magnetic stripe 410 may be disposed on the inner surface of card inlay 411 or card housing 412. As discussed above, magnetic stripe 410 may be disposed within pocket 420, which may be provided on an inner surface of card inlay 411, card housing 412, or both. It is understood that the embodiments shown in FIGS. 8A and 8B can be combined with other embodiments, such as those shown in FIGS. 2-7.

Figure 9A:
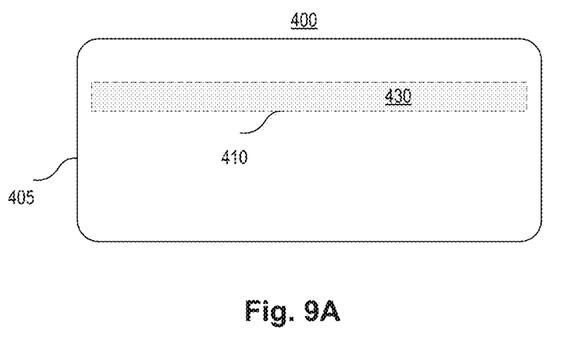
FIGS. 9A and 9B show top views of an exemplary transaction card, consistent with the disclosed embodiments.
Figure 9B:
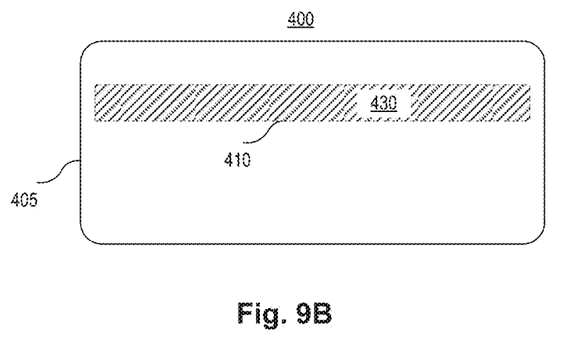

FIGS. 9A and 9B show top views of exemplary transaction card 400 consistent with the disclosed embodiments. Magnetic stripe 410 is disposed inside card frame 405 and may or may not be visible. For example, when the material for forming card inlay 411 and/or card housing 412 is not transparent or translucent, magnetic stripe 410 disposed inside card frame 405 may not be visible from outside. When the material for forming card inlay 411 and/or card housing 412 is transparent or translucent, magnetic stripe 410 may be visible from outside. When a transparent or translucent material is used for forming a portion of card inlay 411 and/or card housing 412 at a location corresponding to the location of magnetic stripe 410, magnetic stripe 410 may be visible from outside.

In the embodiments in which magnetic stripe 410 is not visible, a stripe indicator 430 may be provided on an exterior surface (e.g., front or back surface) of card frame 405 to indicate to a user the location of magnetic stripe 410 inside card frame 405. Stripe indicator 430 may be provided on the exterior surface at the same location with respect to the edges of card frame 405 as magnetic stripe 410. In other words, stripe indicator 430 may be located on the exterior surface at a location above magnetic stripe 410 in the thickness dimension of card frame 405. Stripe indicator 430 may include various indicators for indicating the location of magnetic stripe 410. For example, stripe indicator 430 may appear differently than other portions of the exterior surface of card frame 405 to indicate the location of magnetic stripe 410. In one embodiment, stripe indicator 430 may have a color that is different from the color of the other portions of the exterior surface. In another embodiment, stripe indicator 430 may have a printed pattern that is not present in the other portions of the exterior surface. In some embodiments, stripe indicator 430 may include a material that feels or looks differently than the material included in the other portions of card frame 405. In some embodiments, stripe indicator 430 may use icons, texts, or other suitable ornamental items to indicate the location of magnetic stripe 410.

Other aesthetic techniques known in the art may also be used in stripe indicator 430 to indicate the location of magnetic stripe 410 inside card frame 405. For example, stripe indicator 430 may be printed with an ink having a different finish than the other portions of the exterior surface of card frame 405. In one embodiment, stripe indicator 430 may be printed with a matte finish while the other portions of the exterior surface may be printed with a glossy finish. Other aesthetic techniques, such as heat transfer (e.g., stripe indicator 430 having a different thermo transfer capability than other portions of card frame 405), may also be used to indicate the location of the internal magnetic stripe 410. It is understood that the embodiments shown in FIGS. 9A and 9B can be combined with other embodiments disclosed herein, such as those disclosed in FIGS. 2-8.

Different materials may be used to construct card frame 405 including card inlay 411 and card housing 412. Suitable materials include TPE (thermoplastic elastomer) resins and mixture of TPE and another material, such as TPE-PBT resins (thermoplastic elastomer mixed with polybutylene terephthalate), TPE mixed with acetal homopolymers, etc. Acetal homopolymers may include commercially available acetal homopolymers, such as Delrin® made by DuPont®. Other or different commercially available homopolymers may be used, if desired.

Thermoplastic elastomers (TPEs) may include of copolymers and/or mixtures of polymers that exhibit properties of thermoplastics and elastomeric materials. For example, the resin used to form card frame 405 may include a polyester elastomer, a block copolymer, a thermoplastic olefin, an elastomeric alloy, a thermoplastic polyurethane, a thermoplastic copolyester, or a thermoplastic polyamide.

In some embodiments, the resin mixture used to form card frame 405 includes a polyester elastomer, such as a commercially available polyester elastomer. Commercially available polyester elastomers suitable for use in forming card frame 405 with a soft touch feel may include Hytrel® 8238 made by DuPont®. Other suitable polyester elastomers that are commercially available may include Hytrel® 7246 made by DuPont®. While some commercially available TPEs are mentioned specifically herein, other TPEs may be used in various embodiments.

The resin mixture for forming card frame 405 may include materials for increasing the strength and durability of card frame 405. For example, the resin mixture for forming card frame 405 may include polybutylene terephthalate (PBT) or be mixed with materials that include PBT. Suitable PBTs or materials that include PBT may include commercially available PBTs, such as Crastin® made by DuPont®. Other or different commercially available PBTs or materials that contain PBT may be used, if desired. As used herein, reference to PBT should be understood to include materials containing PBT.

The PBT used in the resin mixture for forming card frame 405 may have a flexural modulus in the range of 1600-8500 MPa. For example, the PBT used in the resin mixture for forming card frame 405 may have a flexural modulus in the range of 1600-8500 MPa, 2000-8000 MPa, 2500-7500 MPa, 3000-7000 MPA, 3500-6500 MPa, 4000-6000 MPa, 4500-5500 MPa, or 4750-5250 MPa. Depending on the selected PBT and/or other materials used in the resin for forming card frame 405, the selected PBT may have a different flexural modulus, if desired.

The PBT used in the resin mixture for forming card frame 405 may also have a flexural strength in the range of 50-200 MPa. For example, the PBT used to for card frame 405 may have a flexural strength in the range of 50-200 MPa, 75-175 MPa, 100-150 MPa, or 120-130 MPa. Depending on the selected PBT and/or other materials used in the resin for forming card frame 405, the selected PBT may have a different flexural strength, if desired.

The resin mixture for forming card frame 405 may include a mixture of TPE and one or more of acetal homopolymer and PBT. The resin mixture forming card frame 405 may include a mixture having a 50:50 ratio, a 60:40 ratio, a 40:60 ratio, a 70:30 ratio, a 30:70 ratio, or another ratio of TPE to one or more of acetal homopolymer and PBT. The resin mixture for forming card frame 405 may include other or additional materials, if desired.

Consistent with the disclosed embodiments, high output magnetic stripes can be used as internal magnetic stripe 410 to reduce the failure rate and meet the ISO specification. For example, the failure rate of a high output internal magnetic stripe 410 consistent with the disclosed embodiments may not exceed 1.5%, 2%, or 3%. Magnetic stripes used in traditional cards may not meet the ISO specification on the card reading failure rate because they are typically low output magnetic stripes.

Figure 10:
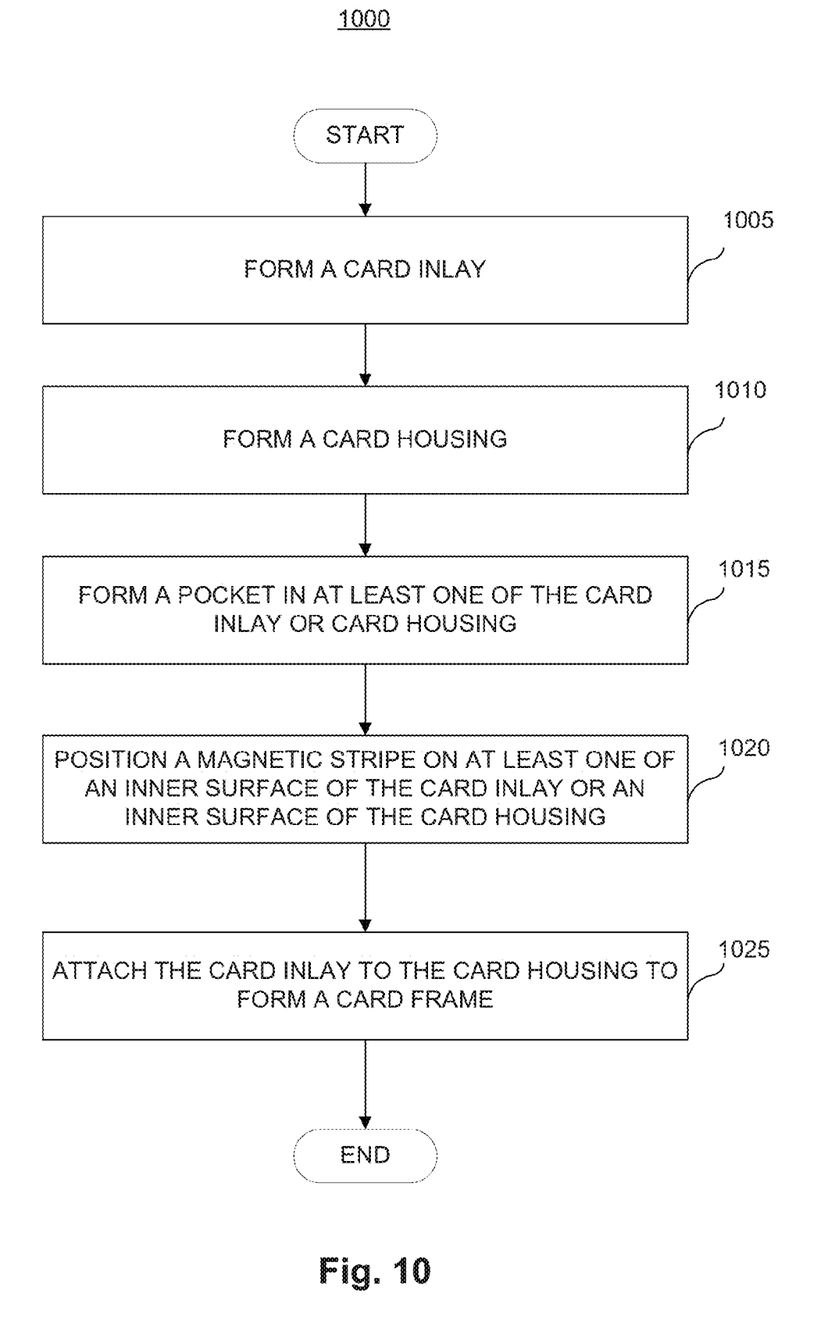
FIG. 10 is a flowchart illustrating an exemplary method for manufacturing a transaction card, consistent with the disclosed embodiments.

FIG. 10 is a flowchart illustrating an exemplary method 1000 for manufacturing a transaction card, consistent with the disclosed embodiments. Method 1000 may be performed by one or more machines or devices, such as an injection molding device, a CNC machining device, and other automated manufacturing devices, which may be controlled by at least one processor. The processor may be specially programmed to operate one or more manufacturing devices to perform the disclosed methods for manufacturing transaction card 400.

As shown in FIG. 10, method 1000 may include forming a card inlay (step 1005). For example, an injection molding device may form card inlay 411. Method 1000 may also include forming a card housing (step 1010). For example, the injection molding device may form card housing 412.

Method 1000 may include forming a pocket in at least one of the card inlay or the card housing (step 1015). For example, the injection molding device may form pocket 420 in an inner surface of either card inlay 411, card housing 412, or both (by forming a first portion of pocket 420 in the inner surface of card inlay 411 and a second portion of pocket 420 in the inner surface of card housing 412). When pocket 420 is formed in either card inlay 411 or card housing 412, pocket 420 may be formed in the same injection molding process as card inlay 411 or card housing 412. When pocket 420 is formed by a first portion in card inlay 411 and a second portion in card housing 412, the first portion may be formed together with card inlay 411 in the same injection molding process. The second portion may be formed together with card housing 412 in the same injection molding process. In some embodiments, after card inlay 411 and/or card housing 412 are formed, a subsequent CNC machining device may form pocket 420 in an inner surface of card inlay 411, card housing 412, or both. Pocket 420 may be formed in the inner surface of card inlay 411 and/or card housing 412 by removing (through the CNC machining process) a portion of card inlay 411 and/or card housing 412 from their inner surfaces.

Method 1000 may include positioning a magnetic stripe on at least one of an inner surface of the card inlay or an inner surface of the card housing (step 1020). For example, magnetic stripe 410 may be affixed (e.g., via an adhesive layer) to an inner surface of card inlay 411 or an inner surface of card housing 412 at a location corresponding to the location of pocket 420. In some embodiment, an adhesive layer may not be used. Magnetic stripe 410 may be disposed within pocket 420 and securely held by card inlay 411 and card housing 412 when card inlay 411 and card housing 412 are attached to each other.

Method 1000 may also include attaching the card inlay to the card housing to form a card frame (step 1025). When the card frame is formed, the magnetic stripe is disposed inside the card frame between the card inlay and the card housing.

In some embodiments, the method may further include forming another pocket in card inlay 411 and/or card housing 412 for embedding a microchip. In some embodiments, the method may further include printing card information on a surface of the card inlay and/or card housing. The card information may include, but is not limited to, card number, expiration date of the card, VISA/Mastercard logo, hologram, card issuing company logo, customer/card holder's name, a photo of the card holder, and a signature of the card holder.

While illustrative embodiments have been described herein, the scope includes any and all embodiments having equivalent elements, modifications, omissions, combinations (e.g., of aspects across various embodiments), adaptations or alterations based on the present disclosure. For example, the order of the steps of the above exemplary method may be rearranged in any preferred or suitable order, or any step may be removed or added.

The elements in the claims are to be interpreted broadly based on the language employed in the claims and not limited to examples described in the present specification or during the prosecution of the application, which examples are to be construed as non-exclusive. It is intended, therefore, that the specification and examples be considered as example only, with a true scope and spirit being indicated by the following claims and their full scope of equivalents.

What is claimed is:

1. A transaction card, comprising:
    a curved card frame having a card inlay and a card housing;
    the card inlay comprising a first recessed portion;
    the card housing comprising a second recessed portion disposed adjacent to the first recessed portion;
    the first recessed portion and the second recessed portion together forming a pocket;
    a curved magnetic stripe disposed within the pocket; and
    a stripe indicator disposed on an exterior surface of the card frame.

2. The transaction card of claim 1, wherein the magnetic stripe occupies an entire space of the pocket such that the magnetic stripe is constrained in at least a thickness direction.

3. The transaction card of claim 1, further comprising an adhesive layer disposed inside the pocket,
wherein the magnetic stripe is affixed to the card frame by the adhesive layer.

4. The transaction card of claim 1, wherein the magnetic stripe has a distance of 100-190 microns to an exterior surface of the card inlay or the card housing.

5. The transaction card of claim 1, wherein a curvature of the magnetic stripe and a curvature of the card frame are the same.

6. The transaction card of claim 1, wherein a curvature of the magnetic stripe and a curvature of the card frame are different.

7. The transaction card of claim 1, wherein the stripe indicator has a color that is different from a color of the exterior surface of the card frame.

8. The transaction card of claim 1, wherein the stripe indicator has a printed pattern that is not present in the exterior surface of the card frame.

9. The transaction card of claim 1, wherein the stripe indicator comprises a texture that is different from a texture of the exterior surface of the card frame.

10. The transaction card of claim 1, wherein the stripe indicator comprises icons or texts that indicate a location of the magnetic stripe.

11. A method of manufacturing a transaction card, comprising:
forming a curved card frame, the card frame comprising a card inlay and a card housing;
forming a first recessed portion in the card inlay;
forming a second recessed portion disposed adjacent to the first recessed portion in the card housing, the first and second recessed portions forming a pocket within said magnetic frame;
positioning a curved magnetic stripe within the pocket; and
attaching the card inlay to the card housing to trap the magnetic stripe within said pocket; and
disposing a stripe indicator on an exterior surface of the card frame.

12. The method of claim 11, wherein the magnetic stripe occupies an entire space of the pocket such that the magnetic stripe is constrained in at least a thickness direction.

13. The method of claim 11, further comprising:
disposing an adhesive layer inside the pocket; and
fixing the magnetic stripe to the card frame by the adhesive layer.

14. The method of claim 11, further comprising positioning the magnetic stripe at a distance of 100-190 microns to an exterior surface of the card inlay or the card housing.

15. The method of claim 11, wherein a curvature of the magnetic stripe and a curvature of the card frame are the same.

16. The method of claim 11, wherein a curvature of the magnetic stripe and a curvature of the card frame are different.

17. The method of claim 11, wherein the stripe indicator has a color that is different from a color of the exterior surface of the card frame.

18. The method of claim 11, wherein the stripe indicator has a printed pattern that is not present in the exterior surface of the card frame.

19. The method of claim 11, wherein the stripe indicator comprises a texture that is different from a texture of the exterior surface of the card frame.

20. The method of claim 11, wherein the stripe indicator comprises icons or texts that indicate a location of the magnetic stripe.

* * * * *